United States Patent
Heene et al.

(10) Patent No.: US 7,191,147 B2
(45) Date of Patent: Mar. 13, 2007

(54) FACILITATING THE SALE OF AD ITEMS VIA THE INTERNET

(75) Inventors: Michael E. Heene, Littleton, CO (US); Michael H. Rieger, Parker, CO (US)

(73) Assignee: Adpay, Inc., Littleton, CO (US)

( * ) Notice: Subject to any disclaimer, the term of this patent is extended or adjusted under 35 U.S.C. 154(b) by 271 days.

(21) Appl. No.: 10/866,228

(22) Filed: Jun. 10, 2004

(65) Prior Publication Data
US 2004/0254853 A1 Dec. 16, 2004

Related U.S. Application Data

(60) Provisional application No. 60/478,105, filed on Jun. 12, 2003.

(51) Int. Cl.
*G06Q 30/00* (2006.01)
(52) U.S. Cl. ............................... 705/26; 705/1; 705/14
(58) Field of Classification Search ................. 705/26, 705/27, 1, 14
See application file for complete search history.

(56) References Cited

U.S. PATENT DOCUMENTS

| | | |
|---|---|---|
| 4,645,873 A | 2/1987 | Chomet |
| 5,283,731 A | 2/1994 | Lalonde et al. |
| 5,819,259 A | 10/1998 | Duke-Moran et al. |
| 5,832,432 A | 11/1998 | Trader et al. |
| 5,845,262 A | 12/1998 | Nozue et al. |
| 5,909,670 A * | 6/1999 | Trader et al. ................. 705/14 |
| 6,128,651 A | 10/2000 | Cezar |
| 6,161,127 A | 12/2000 | Cezar et al. |
| 6,202,051 B1 | 3/2001 | Woolston |
| 6,253,188 B1 * | 6/2001 | Witek et al. .................. 705/14 |

(Continued)

FOREIGN PATENT DOCUMENTS

WO   WO0043933 A1 *  7/2000

(Continued)

OTHER PUBLICATIONS

Washingtonian, Sep. 1998, v. 33, n. 11, pp. 3, 4, 171, 177.☐☐.*

(Continued)

*Primary Examiner*—Jeffrey A. Smith
*Assistant Examiner*—Jason B. Dunham
(74) *Attorney, Agent, or Firm*—Hamilton & DeSanctis

(57) ABSTRACT

Systems and methods for facilitating the sale of classified ad items are provided. According to one embodiment, a linkage is created between a print advertisement and an online counterpart. Consumers are encouraged to view and/or purchase online an item for sale in the print classified ad. For example, a graphic, text, icon or other indicia may indicate the item is also accessible in an online environment. According to another embodiment, ad data for an e-commerce enabled online classified advertisement is originated by a periodical publisher via a call center and passed to the e-commerce system. In another embodiment, consumers placing an order for an advertisement are provided with multiple e-commerce selling format options that define the manner in which an e-commerce application will attempt to sell the subject of the ad. For example, the consumer may select a fixed price, a negotiated price, or an auction selling format.

6 Claims, 12 Drawing Sheets

U.S. PATENT DOCUMENTS

| | | |
|---|---|---|
| 6,415,264 B1 | 7/2002 | Walker et al. |
| 6,446,045 B1 | 9/2002 | Stone et al. |
| 6,466,917 B1 | 10/2002 | Goyal et al. |
| 6,483,895 B2 | 11/2002 | Bixler et al. |
| 6,523,037 B1 | 2/2003 | Monahan et al. |
| 6,598,026 B1 | 7/2003 | Ojha et al. |
| 6,604,107 B1 | 8/2003 | Wang |
| 6,732,161 B1 | 5/2004 | Hess et al. |
| 6,732,162 B1 | 5/2004 | Wood et al. |
| 6,748,366 B1 | 6/2004 | Hurwitz et al. |
| 6,748,422 B2 | 6/2004 | Morin et al. |
| 6,757,710 B2 | 6/2004 | Reed |
| 6,769,018 B2 | 7/2004 | Gagnon |
| 6,895,557 B1 | 5/2005 | Wood et al. |
| 2001/0029538 A1 | 10/2001 | Blockton |
| 2001/0034635 A1 | 10/2001 | Winters |
| 2002/0002509 A1 | 1/2002 | Wagom |
| 2002/0016735 A1* | 2/2002 | Runge et al. ............... 705/14 |
| 2002/0019768 A1 | 2/2002 | Fredrickson |
| 2002/0027567 A1* | 3/2002 | Niamir ..................... 345/738 |
| 2002/0035629 A1 | 3/2002 | Sullo |
| 2002/0059228 A1 | 5/2002 | McCall et al. |
| 2002/0073034 A1* | 6/2002 | Wagner et al. ............. 705/51 |
| 2002/0087420 A1 | 7/2002 | Higgins |
| 2002/0103752 A1 | 8/2002 | Berger |
| 2002/0120506 A1 | 8/2002 | Hagen |
| 2002/0152245 A1 | 10/2002 | McCaskey et al. |
| 2002/0156678 A1 | 10/2002 | Adams |
| 2002/0161648 A1 | 10/2002 | Mason |
| 2002/0194070 A1 | 12/2002 | Totham |
| 2003/0040970 A1 | 2/2003 | Miller |
| 2003/0046152 A1 | 3/2003 | Colas |
| 2003/0055662 A1 | 3/2003 | Collins |
| 2003/0063790 A1 | 4/2003 | Kane |
| 2003/0064777 A1 | 4/2003 | Baerlocher et al. |
| 2003/0069790 A1* | 4/2003 | Kane ........................ 705/14 |
| 2003/0135412 A1 | 7/2003 | Spelcher |
| 2003/0144925 A1 | 7/2003 | Greenberg |
| 2003/0154164 A1 | 8/2003 | Mascavage |
| 2003/0163459 A1 | 8/2003 | Shem-Ur |
| 2003/0177120 A1 | 9/2003 | Stodolsky |
| 2003/0191839 A1 | 10/2003 | Saljeseth |
| 2003/0220866 A1 | 11/2003 | Pisaris-Henderson |
| 2004/0035923 A1 | 2/2004 | Kahr |
| 2004/0128224 A1 | 7/2004 | Dabney |
| 2004/0138962 A1 | 7/2004 | Kopelman et al. |
| 2004/0163289 A1 | 8/2004 | Pearson |
| 2004/0181453 A1 | 9/2004 | Ray et al. |
| 2004/0230676 A1 | 11/2004 | Spivack et al. |

FOREIGN PATENT DOCUMENTS

| | | |
|---|---|---|
| WO | WO 01/29744 | 4/2001 |

OTHER PUBLICATIONS

Hidden Inn Web Page, innbook.com site, Dec. 2,2000, accessed from www.archive.org on May 26, 2006, 1 page.*
Steve Outing, Newspapers Bar URL's in ads, Editor & Publisher, v. 131, n. 15, p. 6, Apr. 11, 1998, DialogWeb accession No. 01616529-02-67518. URL Newspaper Ads.*
Washingtonian, Sep. 1998, v. 33, n. 11, pp. 3,4,171,177.*
New Media Age, May 29, 2003 p. 12(1) "Fish4 targets Europe with FinnTech joint venture," Jonathan Webdale.
Internet Magazine, Mar. 2003 p. 90(3) "Put classified ads on your site." Lance Concannon.
EuropeMedia, Sep. 17, 2002 pNA "Classified ad sites extend to print".
EuropeMedia, Sep. 10, 2002 pNA "Newspapers launch internet portal for classifieds" (derMarkt).
Imaging Update, May 1, 2002 v13 i5 pNA "IPIX Rimfire Photo Solution Integrated With Adstar Service."
EuropeMedia, Feb. 18, 2002 pNA "Newspapers create online classified network."
New Media Age, Nov. 29, 2001 p. 71(1) "That was then . . . NMA Nov. 28, 1996" (Gadfly).
Computing Canada, Oct. 19, 2001 v27 i22 p. 17 "Looking Back".
Computer Shopper, Sep. 17, 2001 v21 i9 p. 21 "Classified Information" (eBay placing classified ads in Minneapolis Star Tribune and the St. Petersburg Times) Elaine X. Grant.
InternetWeek, Aug. 20, 2001 p. 15 "Times Expands Ad Services With Portal" (NYTadvertising.com)(Company Business and Marketing) Jade Boyd.
InternetWeek, Aug. 6, 2001 p. 40 "E-Business of the Week" (Knight Ridder) (Company Business and Marketing)(Brief Article).
Customer Interaction Solutions, Feb. 2001 v19 i8 p. 3 , "Move Over Cue Cat Here Comes . . . SpeedURL?" (Company Business and Marketing) Joe Hagan.
New Media Age, Nov. 23, 2000 p. 3 "Loot to Run Auctions."
Newsbytes, Oct. 18, 2000 pNWSB00292016 "As Of Next Week, MercuryCenter.com Goes Strictly Portal" (Company Business and Marketing) Kevin Featherly.
Newsbytes, May 16, 2000 pNA "Singapore-Born Online Auction Firm Expands To Philippines May 16, 2000" Melvin G. Calimag.
Electronic Advertising & Marketplace Report, Apr. 4, 2000 v14 i7 pNA "AdStar.com's Advertise 123.com Opens Passageway For Classifieds."
New Media Age, Dec. 16, 1999 pNA "Tolhurst bids for offspirng of Loot.com; Loot's online division under Graham Tolhurst is expanding into new sites" (Company Business and Marketing) Yinka Adegoke.
Inter@ctive Week, Oct. 11, 1996 v6 i42 p. 50 "Classifieds Carry E-Mail" (USA.net)(Company Business and Marketing) Steven Vonder Haar.
Software Industry Report, Aug. 16, 1999 v31 i16 p. 3 "Publishing Partners Buy Adds Advertising Component To Unisys Publishing Solutions."
San Jose Mercury News, Nov. 12, 1998 p. C1(2) "Net auction marketplace gets a lift" (eBay Inc, Auction Universe).
Newsbytes, Sep 24, 1998 n105 pNA "IPO Market Re-Ignites With eBay Sep. 24, 1998."
Newsbytes, Jul. 30, 1998 pN/A "****Classified Ventures Grows Jul. 30, 1998."
Newsbytes, Jun. 10, 1998 n29 pNEW06100028 "****Excite Calls Online Auctions."
Forbes, Apr. 6, 1998 v161 n7 p. 46(2) "Bill Gates wants our business"(on-line classified advertising) (includes related article on Junglee Corp) (Industry Trend or Event) Kelly Barron.
Information Today, Nov. 1997 v14 n10 p. 36(1) "ClassiFind Network launches multimedia classified ad Web site."
Newsbytes, Apr. 10, 1997 pNEW04100077 "Italy—Classified Ads Get An Internet Injection."
Internet Business News, Aug. 1,1999 pNA "Online version of 'LOOT' free ads publication goes live."
Computer Weekly, Jul. 29, 1999 p. 28 "Siteseeing".
Inter@active Week, Oct 11, 1999 v6 i42 p. 50 "Classifieds Carry E-Mail"(USA.net)(Company Business and Marketing) Steven Vonder Haar.
E-mail Communication from Michael Kranitz (michael@rcuniverse.com) to info@ faegre.com and info@adpay.com, dated May 27, 2006.
Internet Archive Wayback Machine. http:web.archive.org/web/*/http://www.rcmarket.com. (76 results) p. 1. Printed on Jun. 6, 2006."Search Results for Jan. 1, 1996-Jun. 6, 2006."
RC market—The Largest R/C Classified Network on the Web. http://web.archive.org/web/20030208022211.rcmarket. com/index. cfm?fuseaction=ad&class... pp. 1-2. Printed on Jun. 6, 2006.
RC Market—The Largest R/C Classified Network on the Web. http://web.archive.org/web/20030304204524/rcmarket. com/index. cfm?fuseaction=ad_respo... pp. 1-2. Printed on Jun. 6, 2006.
RC Market—The Largest R/C Classified Network on the Web. http://web.archive.org/web/20030609180649/http://rcmarket.com. pp. 1-2. Printed on Jun. 6, 2006.

Internet Archive Wayback Machine. "Search Results for Jan. 1, 1996-Jun. 6, 2006." (159 results) http:web.archive.org/web/*/http://www.rcmarket.com. pp. 1-2. Printed on Jun. 6, 2006.

"RCUniverse—The Ultimate RC Forum!—Buy, Sell, Trade and Discuss RC Airplanes, RC . . . " RCUniverse.com. http//web.archive.org/web/20030611214542/http://rcuniverse.com/ pp. 1-11. Printed on Jun. 6, 2006.

Avanquest Software eStore. https://shop.avanquest.com/store/index.php?page=invoices&u=b3e816ea9e24377f99d0649d... p. 1. Printed on Jul. 9, 2006.

Kaango.com Classifieds—Hop to it! "One Ad. Many Sites. Unlimited Re. . . "http://kaango.com. pp. 1-2. Printed on Jun. 13, 2006.

Kaango.com Classifieds—Hop to it! "Place Add" http://kaango.com/fePostAd/nID/14. p. 1. Printed on Jun. 13, 2006.

Kaango.com Classifieds—Hop to it! "Place Add-New Add" http://kaango.com/fePostAd/nID/14. pp. 1-4. Printed on Jun. 13, 1006.

Kaango.com Classifieds—Hop to it! "Help Topic: Market Rules & Privacy Policy." http://kaango.com/feHelp/12/. pp. 1-7. Printed on Jun. 13, 2006.

Kaango.com Classifieds—Hop to it! "Help Topic: Ad Listings—Offers & Buying." http://kaango.com/feHelp/8. pp. 1-2. Printed on Jun. 13, 2006.

Kaango.com Classifieds—Hop to it? "Help Topic: Ad Listings—Selling." http://kaango.com/feHelp/2. pp. 1-2. Printed on Jun. 13, 2006.

Kaango.com Classifieds—Hop to it! "Help Topic: Ad Listings—Feedback & Security." http://kaango.com/feHelp/7. p. 1. Printed on Jun. 13, 2006.

Kaango.com Classifieds—Hop to it! "Help Topic: General." http://kaango.com/feHelp/13. pp. 1-2. Printed on Jun. 13, 2006.

Kaango.com Classifieds—Hop to it! "Help Topic: My Market Tools." http://kaango.com/feHelp/6. pp. 1-2. Printed on Jun. 13, 2006.

Kaango.com Classifieds—Hop to it! "Help Topic: Registration." http://kaango.com/feHelp/5. pp. 1-5. Printed on Jun. 13, 2006.

Kaango.com Classifieds—Hop to it! "Help Topic: Transaction Disputes." http://kaango.com/feHelp/10. p. 1. Printed on Jun. 13, 2006.

Kaango.com Classifieds—Hop to it! http://kaango.com/feListAdCategories. pp. 1-4. Printed on Jun. 13, 2006.

Kaango.com Classifieds—Hop to it! "Respond to Seller." http://kaango.com/feCreateOffer/104224. pp. 1-2. Printed on Jun. 13, 2006.

Kaango.com Classifieds—Hop to it! "Respond to Seller." http://kaango.com/feCreateQuestion/104224. p. 1. Printed on Jun. 13, 2006.

Kaango Partner Newspapers. "Partner Newspaper." http://sales.kaango.com/partners.cfm. p. 1. Printed on Jun. 13, 2006.

Inland Valley Daily Bulletin Classifieds—Hop to it! http://dailybulletin.kaango.com. pp. 1-2. Printed Jun. 13, 2006.

Home>>Main Categories>>Merchandise>>Jewelry & Watches :: Kaango.com Classifieds . . . http://www.kaango.com/feListAds/categoryID/155. pp. 1-2. Printed on Jun. 13, 2006.

Silver Biker Rings :: Kaango.com Classifieds—Hop to it! "Silver Biker Rings." http://www.kaango.com/feViewAd/104224. p. 1. Printed on Jun. 13, 2006.

* cited by examiner

800

Choose a Category
Merchandise ▼
⇧ Merchandise - Coins, Stamps ▼   805

Choose Your Selling Format

○ Option 1 - Create an ad with Photos and Multimedia Only
Create an ad with expanded text, photos and/or multimedia but with no commerce capabilities. This is perfect for real estate or other large ticket items that others would not buy with a credit card.

○ Option 2 - Sell at a Negotiated Price  — Negotiated Price Option 811
Potential buyers can make offers on your item. You will have the ability to either accept or reject these offers. You can also close this item at anytime for any reason. Once you have accepted an offer, the buyer can purchase the item at the agreed upon price. Includes Option 1 above.

○ Option 3 - Sell at a Fixed Price  — Fixed Price Option 812
Buyers can purchase your item, without waiting, for a fixed price. There is no auction or price negotiation, you are just offering the items for sale at a fixed price. Includes Option 1 above.

○ Option 4 - Sell item at Online Overtime Auction*  — Auction Option 813
Allow potential buyers to place bids on your item. After the auction duration has expired, the auction ends after the bidding has stopped for 5 minutes after the chosen end date and time. The high bidder is the winner and buys the item for the high bid. Includes Option 1 above.

\* - Please note that you must hold onto your item if you select the auction service. You are legally bound to sell to the highest bidder. If you would like to sell your item outside of an auction, please see the "Sell at a Negotiated Price" service below.

} E-Commerce Upsell Options 810

Figure 8

FACILITATING THE SALE OF AD ITEMS VIA THE INTERNET

This application claims the benefit of Provisional Application No. 60/478,105, filed Jun. 12, 2003 which is hereby incorporated by reference in its entirety.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© AdPay, Inc. 2003–2004.

BACKGROUND

1. Field

Embodiments of the present invention generally relate to consumer-to-consumer and business-to-consumer e-commerce. More specifically, embodiments of the present invention relate to methods and systems for facilitating the sale of classified ad items by supplementing print and online classified ads with e-commerce capabilities.

2. Description of the Related Art

Newspapers serve two primary roles: delivering news content, and facilitating a local/regional marketplace. Surprisingly, despite increased competition, for this $61 billion/year consumer-to-consumer and business-to-consumer marketplace in the United States, featuring more than 100 million classified advertisements, newspaper classified advertising has remained essentially unchanged since its introduction over 300 years ago.

In addition to competition in the print media, the newspaper industry now faces intense competition from various on-line service providers for classified advertising, as well. For example, the advent of internet-based merchants, such as eBay, has challenged the role of newspapers in their respective local and regional marketplaces.

While most newspapers now have online versions of their classified ads, the online versions are direct representations of the content presented in the newspaper, simply providing the same content as in print without taking advantage of online ad enhancement and transaction capabilities. As a result, of these and other shortcomings newspapers are already losing more than 15% of their classified listings annually.

BRIEF DESCRIPTION OF THE DRAWINGS

Embodiments of the present invention are illustrated by way of example, and not by way of limitation, in the figures of the accompanying drawings and in which like reference numerals refer to similar elements and in which:

FIG. 8 illustrates a user interface screen through which a seller may e-commerce enable an online classified advertisement according to one embodiment of the present invention.

SUMMARY

Figure 1:
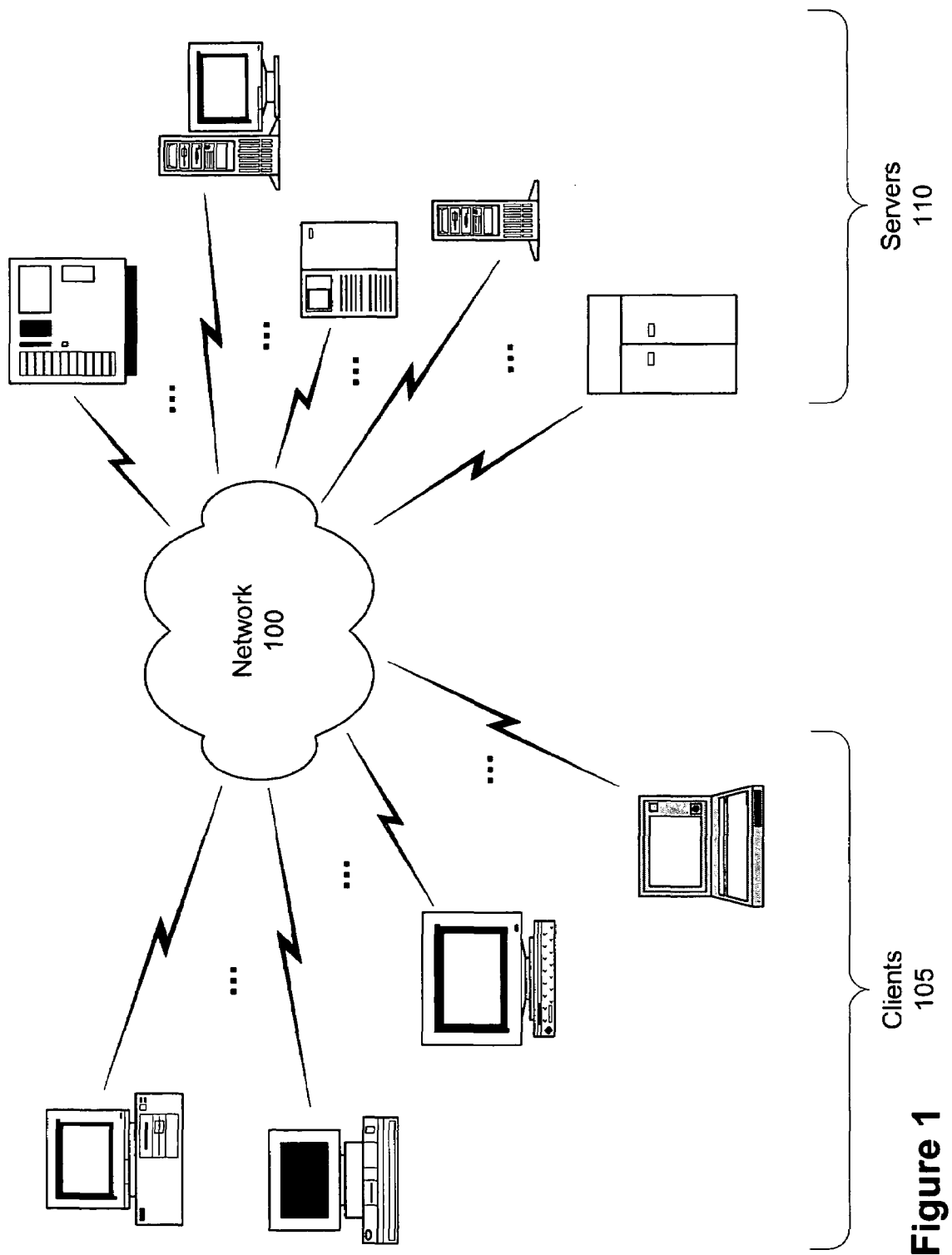
FIG. 1 is a simplified view of an exemplary client-server environment, such as the World Wide Web (the Web), in which online commerce may take place according to one embodiment of the present invention.

Systems and methods are described for facilitating the sale of ad items. According to one embodiment, a method of selling an item associated with an online or print advertisement that involves the use of a specified e-commerce selling method. Responsive to a request to place an advertisement relating to the item for sale, multiple e-commerce selling method options are presented. Then, an indication of the selected e-commerce selling method option is received as well as information associated with the advertisement, ad and seller. Finally, an e-commerce application sells the item in accordance with the selected e-commerce selling format.

Other features of embodiments of the present invention will be apparent from the accompanying drawings and from the detailed description that follows.

DETAILED DESCRIPTION

Systems and methods are described for facilitating the sale of ad items. Broadly stated, embodiments of the present invention seek to add e-commerce capabilities to print and online advertisements, such as online and print classified advertisements. The online advertisements may be online counterparts to print advertisements or may be online only advertisements. According to one embodiment, a linkage is created between a print advertisement and an online counterpart and consumers are graphically or textually encouraged to view online and/or purchase an item of interest that is the subject of a print classified ad. For example, a graphic, text, icon or other indicia may indicate the item for sale in the print classified ad is also available for viewing and/or purchase in an online environment.

According to another embodiment, ad data for an e-commerce enabled online classified advertisement is originated by a periodical publisher via their call center and passed to the ecommerce system.

In another embodiment, consumers placing an order for an advertisement are provided with multiple e-commerce selling format options. The e-commerce selling format options define the manner in which an e-commerce application will attempt to sell the subject of the ad. For example, the consumer may select (1) a storefront or fixed price selling format in which the item is sold for a specified price provided by the consumer, (2) a negotiated price selling format in which a prospective buyer and the seller may interactively arrive at an agreed price via electronic communications of offers, counter offers, rejections and/or acceptances, (3) an auction selling format in which the seller may specify parameters, such as a reserve price, minimum bid increment, etc. and various auction formats may be employed to sell the item.

In the following description, for the purposes of explanation, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware.

Embodiments of the present invention may be provided as a computer program product which may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

While, for convenience, embodiments of the present invention are described with reference to e-commerce enabling online counterparts to newspaper Display and Liner advertisements, the present invention is equally applicable to various other current and future types of print advertisements. Similarly, while embodiments of the present invention are described in the context of ad taking in connection with advertisements intended to be printed in a printed periodical, the approach described herein is applicable to ads that may or may not concurrently appear in print, such as online only classified advertisements where these "online only" classifieds appear in the same search results as other print ads.

Additionally, while embodiments of the present invention are described in the context of an initial deployment environment in which e-commerce functionality is linked to legacy systems, as the demand for e-commerce enabled online advertisements increase, more integrated architectures for storing and distributing ad information are contemplated. For example, in one embodiment, ad information is initially input into a periodical publisher's ad placement software database, processed, tagged, augmented and/or otherwise transformed to produce data appropriate for a target online classifieds database and a target e-commerce system database. Alternative embodiments, however, contemplate the integration or merging of two or more of the multiple databases. For example, additional fields could be added to the periodical publisher's ad placement software database to enable it to serve as both the online classifieds database and the e-commerce system database as well. Consequently, when databases are discussed herein, they should not necessarily be thought of as physically separate data sources.

Additionally, the entire platform can exist on one computer (desktop, server, or even a laptop). For a typical implementation, core components include a web server, database server and an email server for email relay. The hardware specifications including type, components, sizes, etcetera come down to volume/activity. While, one could run this entire platform, e.g., ad placement, online classifieds system, and e-commerce system) a laptop, the number of hits/transactions would be more limited than that achievable by an architecture designed for scalability.

Terminology

Brief definitions of terms, abbreviations, and phrases used throughout this application are given below.

The terms "advertisement," "ad" and related terms, unless accompanied by one or more modifiers, such as print, online, classified, or display, are intended to be used in their broadest sense to refer to any form of notice, such as a poster or a paid announcement in the print, broadcast, online, or electronic media, designed to attract public attention and/or patronage, such as public promotion of products and/or services for sale.

The phrases "classified advertisement," "classified ad" and related terms generally refer to an advertisement, usually brief and in small type, printed in a newspaper, periodical, news letter, penny saver, magazine or other type of printed publication, under headings with other products and/or services for sale of the same category.

The phrase "Liner Ad" is intended to be used consistently with its current industry usage as generally referring to a classified ad, typically printed as a textual ad in a classified section of a newspaper or periodical.

The phrase "Display Ad" is intended to be used consistently with its current industry usage as generally referring to graphical ads. Such graphical ad are typically commercial in nature and may be of varying sizes, e.g., quarter page, half page, full page, and may be placed throughout the newspaper selling or promoting something.

The phrase "House Ad" is intended to be used consistently with its current industry usage as generally referring to a Display ad or Liner ad placed in the periodical, by the periodical, explaining or promoting an "in house" product and/or service. For example, according to one embodiment of the present invention, a periodical may employ House Ads to promote the ability to link print and online classified advertisements to an electronic marketplace that supports multiple forms of selling formats. Additionally, in one embodiment, House Ads are used to educate consumers about e-commerce enabled print and online classified advertisements and where to go online to view, search, and purchase items associated with such print and online classified advertisements.

The terms "connected" or "coupled" and related terms are used in an operational sense and are not necessarily limited to a direct physical connection or coupling.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phases do not necessarily refer to the same embodiment.

If the specification states a component or feature "may", "can", "could", or "might" be included or have a characteristic, that particular component or feature is not required to be included or have the characteristic.

The phrases "online classified advertisement," "online classified ad" and related terms generally refer to an advertisement similar in nature to a classified advertisement, but available for viewing and/or searching in an online environment as part of a web page, for example, via a public network, such as the Internet, or a private network, such as an enterprise Intranet.

The phrases "Online Display Advertisement," "Online Display Ad" and related terms generally refer to an advertisement similar in nature to a classified advertisement, that may or may not be linked to a print advertisement, and is available for viewing and/or searching in an online environment as part of a web page, for example, via a public network, such as the Internet, or a private network, such as an enterprise Intranet.

The term "responsive" includes completely or partially responsive.

FIG. 1 is a simplified view of an exemplary client-server environment, such as the World Wide Web (the Web), in which online commerce may take place. The architecture of the Web follows a conventional client-server model. The terms "client" and "server" are used to refer to a computer's general role as a requester of data (the client) or provider of data (the server). In the present example, clients, such as web clients 105, and servers, such as web servers 110, communicate using a protocol such as HyperText Transfer Protocol (HTTP). In the Web environment, Web browsers reside on clients and render Web documents (pages) served by the Web servers. The client-server model is used to communicate information between clients 105 and servers 110.

In the present example, Web servers 110 are coupled to a public network 100, such as the Internet, and respond to document requests and/or other queries from Web clients 105. When a user selects a document by submitting its Uniform Resource Locator (URL) or selecting a hyperlink associated with the document, a Web browser, such as Netscape Navigator or Internet Explorer, opens a connection to the appropriate server of the Web servers 110 and initiates a request (e.g., an HTTP get) for the document. The server delivers the requested document, typically in the form of a text document coded in a standard markup language such as HyperText Markup Language (HTML).

According to various embodiments of the present invention, client-side users are prospective buyers and/or sellers of products and/or services that may create, search for, view and otherwise interact with online marketplace content, such as e-commerce enabled online classified advertisements. According to one embodiment, e-commerce enabled online classified advertisements are created based upon print classified advertisement counterparts and information relating to the resulting online versions are stored in one or more databases associated with one or more of the Web servers 110.

Figure 2:
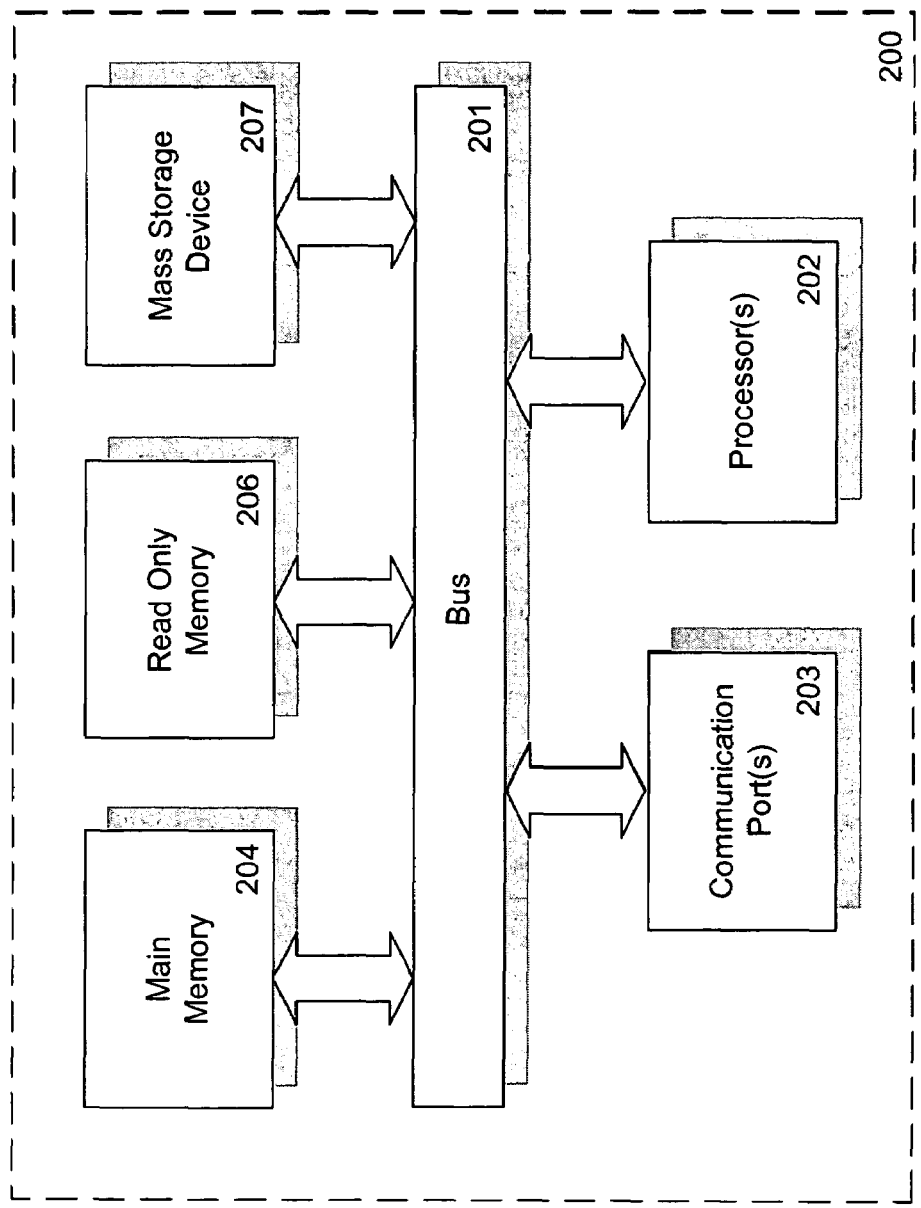
FIG. 2 is an example of a computer system with which embodiments of the present invention may be utilized.

An exemplary computer system 200, representing an exemplary client or server with which various embodiments of the present invention may be utilized will now be described with reference to FIG. 2. In this simplified example, computer system 200 comprises a bus or other communication means 201 for communicating information, and a processing means such as one or more processors 202 coupled with bus 201 for processing information. Bus 201 communicatively couples processor(s) 202 with the other memory, storage and communication blocks. Bus 201 can be ISA, IDE, PCI/PCI-X or SCSI based system bus depending on the storage devices used. Exemplary processors 202 include Intel® Itanium® or Itanium 2® processor(s) or AMD® Opteron® or Athlon MP® processors.

Computer system 200 further comprises a random access memory (RAM) or other dynamic storage device 204 (referred to as main memory), coupled to bus 201 for storing information and instructions to be executed by processor(s) 202. Main memory 204 also may be used for storing temporary variables or other intermediate information during execution of instructions by processor(s) 202.

Computer system 200 also comprises a read only memory (ROM) and/or other static storage device 206 coupled to bus 201 for storing static information and instructions for processor(s) 202. One or more data storage device(s) 207 may also be coupled to computer system 200 for storing information and instructions. For example, hard disks such as the Adaptec® family of SCSI drives, an optical disc, an array of disks such as RAID, such as the Adaptec family of RAID drives, or any other mass storage devices may be used.

Computer system 200 can also be coupled via bus 201 to a display device (not shown), such as a cathode ray tube (CRT) or Liquid Crystal Display (LCD), television (TV), cell phone or other wireless devices for displaying information to a computer user. For example, a user interface, such as a graphical user interface (GUI), may be presented on the display device to facilitate interactions among buyers and/or sellers of items in an online environment.

Typically, an alphanumeric input device (not shown), including alphanumeric and other keys, is coupled to bus 201 for communicating information and/or command selections to processor(s) 202. Another type of user input device is cursor control (not shown), such as a mouse, a trackball, or cursor direction keys for communicating direction information and command selections to processor(s) 202 and for controlling cursor movement on display.

One or more removable storage media (not shown) may also be coupled to computer system 200. Removable storage media can be any kind of external hard-drives, floppy drives, IOMEGA® Zip Drives, Compact Disc—Read Only Memory (CD-ROM), Compact Disc—Re-Writable (CD-RW), Digital Video Disk—Read Only Memory (DVD-ROM).

One or more communication ports 203 may also be coupled to bus 201 for allowing communication and exchange of information to/from with the computer system 200 by way of a Local Area Network (LAN), Wide Area Network (WAN), Metropolitan Area Network (MAN), the Internet, or the public switched telephone network (PSTN), for example. Communication port(s) 203 can be any of an RS-232 port for use with a modem based dialup connection, a 10/100 Ethernet port, or a Gigabit port using copper or fiber. Communication port(s) 203 may be chosen depending on a network such a Local Area Network (LAN), Wide Area Network (WAN), or any network to which the computer system 200 connects. In any event, in this manner, the computer system 200 may be coupled to a number of other network devices, clients and/or servers via a conventional network infrastructure, such as a company's Intranet and/or the Internet, for example.

Embodiments of the present invention may make use of a computer system, such as computer system 200, to host and execute one or more of ad placement software, an online classified system, an e-commerce application, web services, batch and/or real-time data transfer mechanisms, and the like.

Figure 3:
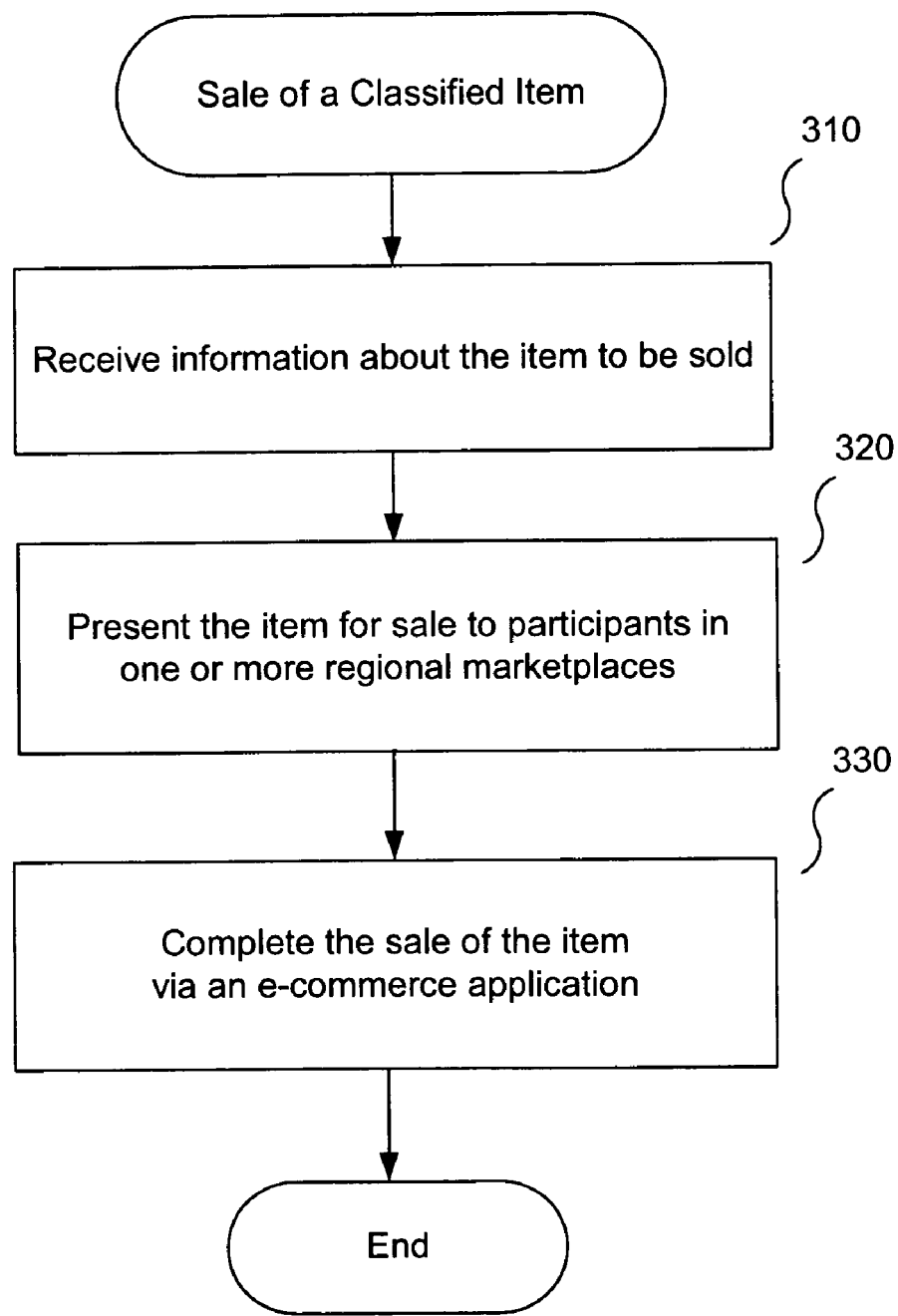
FIG. 3 is a flow diagram illustrating a high-level, end-to-end process for selling a classified ad item according to one embodiment of the present invention.

FIG. 3 is a flow diagram illustrating a high-level, end-to-end process for selling a classified item according to one embodiment of the present invention.

At block 310, information is received about an item to be sold. According to one embodiment, the information is received in the context of the seller of the item placing a classified newspaper advertisement. The information associated with the classified advertisement may include (1) contact information for the seller, such as a phone number and/or an email address; (2) a text description of the item; (3) a price of the item; (4) one or more digital photographs of the item; and (4) multimedia presentation materials about the item. Depending upon the particular e-commerce sales model (e.g., fixed price, best offer, or auction) to be employed for sale of the item, more of less information may be provided. For example, in the context of an auction sales model, the seller may be requested to provide one or more of a minimum price, a bid increment, and a reserve price.

As will be described further below, the information about the item to be sold may be received by a call center representative that keys the information into an ad placement software program associated with a print periodical publisher. Alternatively, the information about the item to be sold may be provided by the seller interacting with online ad placement software. For example, as described further below, the seller may place an order for a print newspaper classified advertisement through the newspaper's web site.

According to one embodiment, the seller may also provide information about an item to be sold via email, by facsimile, through an interactive voice response (IVR) system, or other means of communication.

In one embodiment, information regarding an item for sale may be received by other than ad taker software programs in use at various periodical publishers. For example, the seller may interact with an online wizard or fill out online forms presented by a web site associated with an online classified advertisement system and/or an e-commerce system. Similarly, information regarding an item for sale may be originally entered into in-house (or outsourced) ad taker software associated with an online classified advertisement system and/or an e-commerce system via a call center or online interface.

At block 320, the item for sale is presented to participants in one or more regional marketplaces. According to one embodiment, the information regarding the item for sale is presented to potential consumers in the form of an online classified advertisement. For example, an online marketplace may allow prospective buyers to search for items of interest using search engine functionality and present items for sale matching the prospective buyers' search criteria within search result web pages. In addition to the online classified advertisement, the item for sale may also concurrently be presented to potential consumers in the form of a print newspaper classified advertisement.

At block 330, a transaction involving the item for sale is completed online via an e-commerce application. According to one embodiment, online classified advertisements are e-commerce enabled by augmenting the traditional online classified advertisement information with a hyperlink, such as a "Buy" button, to an e-commerce application. The e-commerce application may provide more detail about the item, such as pictures, additional text, HTML formatted text, sound, video or other electronic media, and allows the buyer to, depending upon the e-commerce model, purchase, make an offer on, or bid on the item.

According to one embodiment, the e-commerce application is associated with an e-commerce system hosted separate and apart from the periodical publisher from which the information associated with the item for sale originated. For example, the e-commerce application may be deployed on an Application Service Provider (ASP) model. In alternative embodiments, however, the e-commerce application may be hosted internally by the periodical publisher and made accessible to participants in an online marketplace via the Web.

Figure 4:
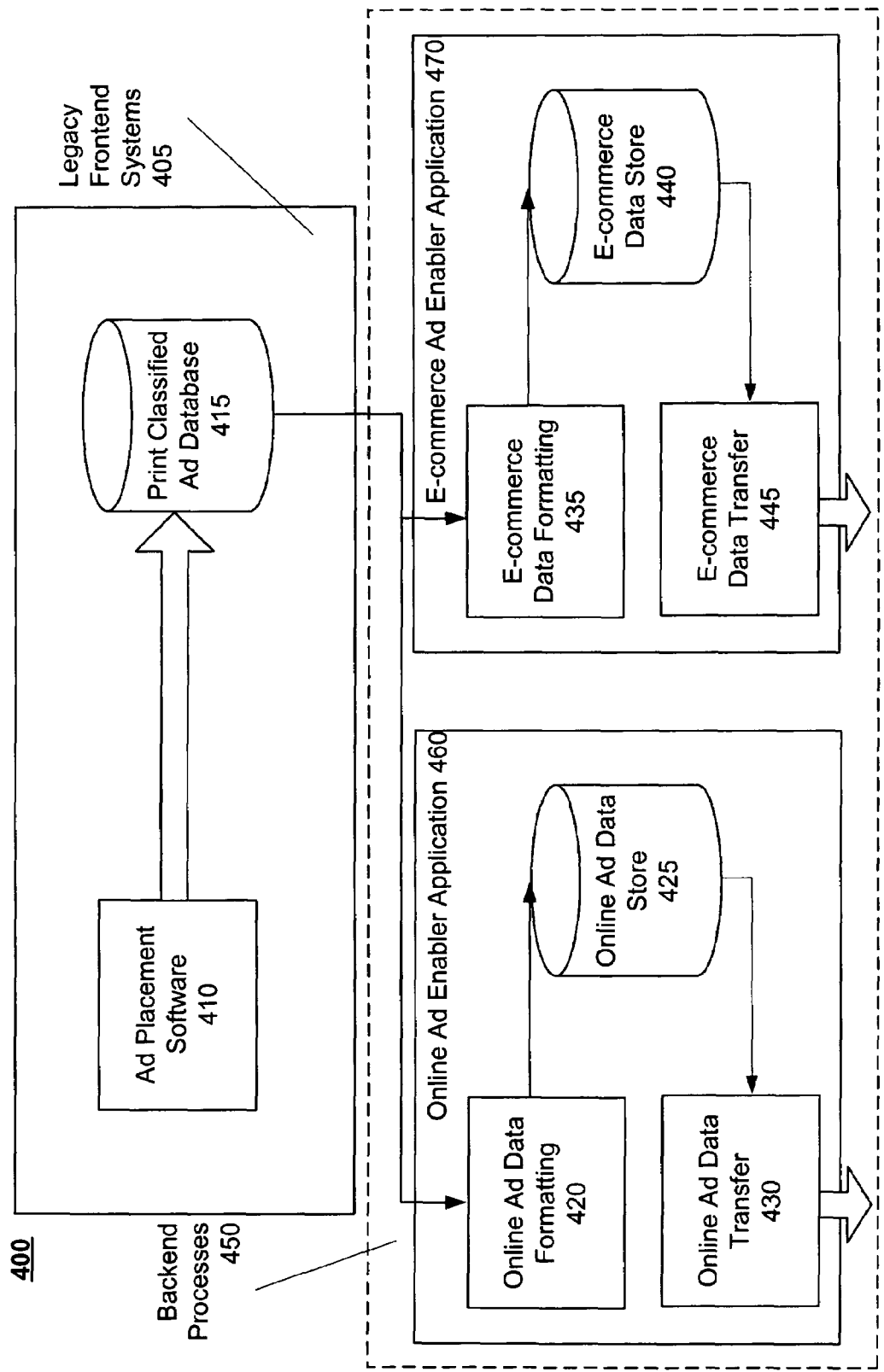
FIG. 4 is a simplified block diagram conceptually illustrating a periodical publisher architecture for supporting the creation of e-commerce enabled online classified advertisements according to one embodiment of the present invention.

FIG. 4 is a simplified block diagram conceptually illustrating an architecture 400 for supporting the creation of e-commerce enabled online classified advertisements according to one embodiment of the present invention.

The architecture of the present example is intended to extend the concept of static online periodical classified ads by adding backend processes. According to one embodiment, a periodical's ad database or online classified web site is integrated with an online, web based, e-commerce application thereby allowing prospective buyers to negotiate a price and purchase the advertised item from the seller.

The present example is illustrative of an initial deployment scenario in which legacy front-end systems 405 of a periodical publisher are left intact and interfaced with internally or externally hosted software systems, such as an online ad enabler application 460 and an e-commerce ad enabler application 470, for performing back-end processes 450.

According to the present example, the periodical publisher has certain legacy front-end systems 405, such as ad placement software 410 and an associated print classified ad database 415, already in place for supporting receipt of ad data, storage of ad data, and printing of conventional classified advertisements based upon the ad data. If the periodical publisher wanted to begin adding electronic marketplace capabilities, such as offering e-commerce enabled online classified advertisements, without investing in infrastructure to support an online e-commerce environment, according to the present example, the periodical publisher could simply interface its legacy front-end systems 405 with the online ad enabler application 460 and the e-commerce ad enabler application 470. One or both of the online ad enabler application 460 and the e-commerce ad enabler application 470 could be deployed within the periodical publisher 400 or hosted by a third party.

According to one embodiment, the online ad enabler application 460 comprises an online ad data formatting module 420, an online ad data transfer module 430, and an online ad batch data store 425, such as a batch file or database. In the present example, the online ad data formatting module 420 actively or passively receives ad data from the print classified ad database 415, processes the received ad data to produce ad data formatted for use by an online classifieds system, and stores the formatted online classified ad data in the online ad data store 425. The online ad data transfer module 430 transfers the formatted online ad data from the online ad data store 425 to an online classifieds database.

According to one embodiment, the e-commerce ad enabler application 470 comprises an e-commerce data formatting module 435, an e-commerce data transfer module 445, and an e-commerce batch data store 440, such as a batch file or database. The e-commerce ad enabler application 470 may run synchronously or asynchronously with respect to the online ad enabler application 460. For example, the two applications may run according to the same schedule, independent schedules, or completion of one may initiate the other.

In the present example, the e-commerce data formatting module 435 actively or passively receives ad data from the print classified ad database 415, processes the received ad data to produce e-commerce data formatted for use by an e-commerce system, and stores the formatted e-commerce data in the e-commerce data store 440. The e-commerce data transfer module 445 transfers the formatted e-commerce data from the e-commerce data store 440 to the e-commerce system.

If the seller is not provided the opportunity to upload images and/or other multimedia data associated with the item for sale during the ad placement process with the periodical publisher, an online interface with the e-commerce system can provide this capability.

Various alternative embodiments will be apparent to those skilled in the art. For example, in alternative embodiments, where maintaining the legacy front-end systems 405 without change is not a priority, ad placement software 410 could directly produce data formatted in accordance with one or both of the online classifieds database and the e-commerce system. Additionally, the e-commerce data could be generated based upon the online ad data, rather than from the print classified data.

Note that in this description, in order to facilitate explanation, the various modules and databases are generally discussed as if they reside on or are part of a single computer system. However, it is contemplated that the modules and databases may actually comprise multiple physical and/or logical devices connected in a distributed architecture; and the various functions performed may actually be distributed among multiple servers of a server farm. Additionally, in alternative embodiments, the functions performed and the data stored may be consolidated and/or distributed differently than as described. For example, if the same system that supported the e-commerce capabilities for the online advertisements served as the online classifieds system, then the functionality of the online ad enabler application 460 and the e-commerce ad enabler application could be merged.

Figure 5:
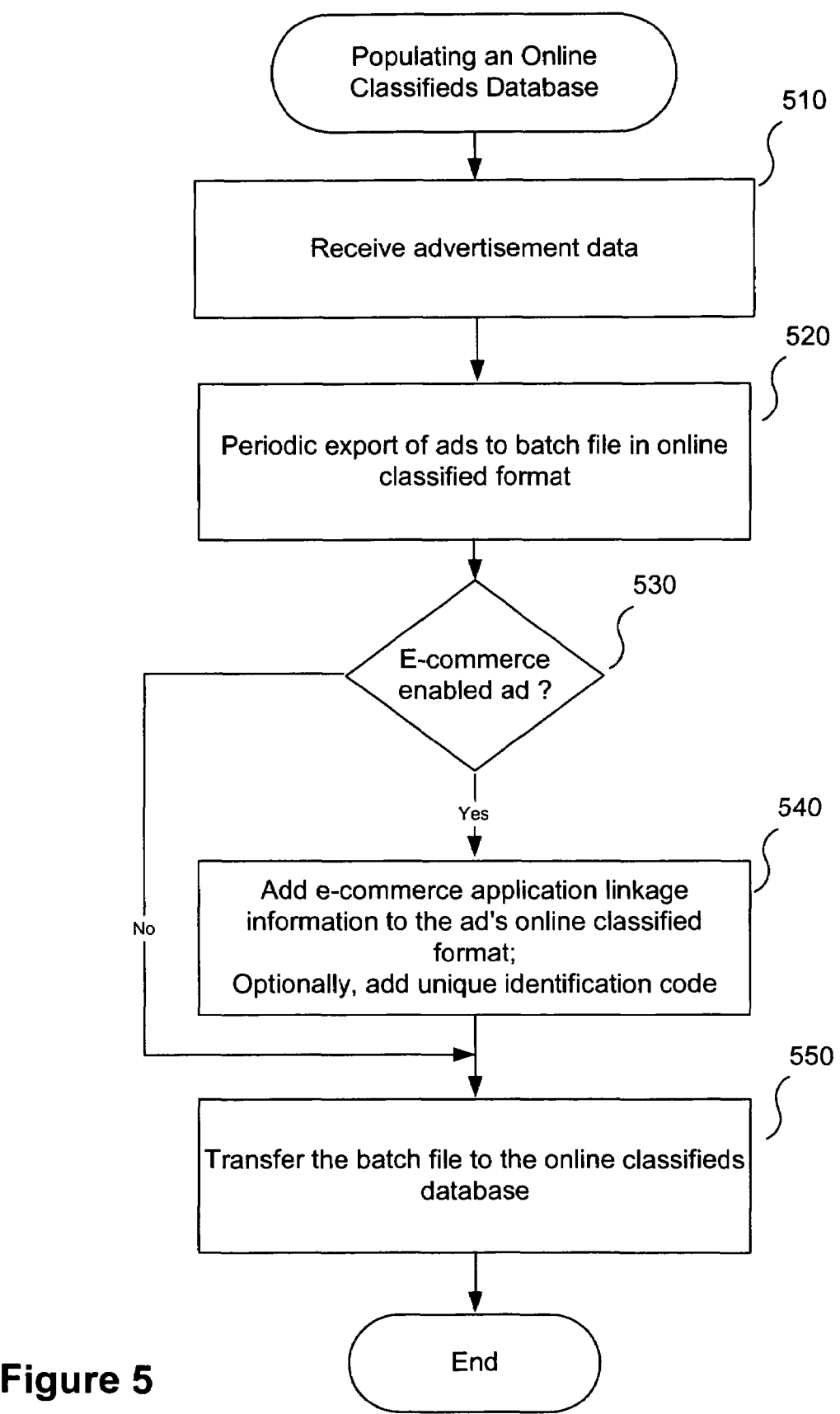
FIG. 5 is a flow diagram illustrating processing involved in connection with populating an online classifieds database with e-commerce enabled online classified advertisements according to one embodiment of the present invention.

FIG. 5 is a flow diagram illustrating processing involved in connection with populating an online classifieds database with e-commerce enabled online classified advertisements according to one embodiment of the present invention.

At block 510, data is received regarding an online advertisement. According to one embodiment, the data is initially received by a periodical publisher. For example, information associated with an item for sale may be provided to the periodical publisher in connection with placement of an online and/or print classified advertisement by the seller. Consequently, according to one embodiment, the advertisement data is received from an ad placement software database associated with the periodical publisher. The transfer of data from the ad placement software database may be active or passive and synchronous or asynchronous with respect to the ad taking process. For example, the ad data may be periodically pulled by the online ad enabler application 460 or pushed by the print classified ad database 410 to the online ad enabler application 460. Alternatively, transfer of ad data may be triggered after ads are placed.

At block 520, periodically ad data is exported from the ad placement software database into a batch file formatted in accordance with a target online classified database format. According to one embodiment, an automated nightly export of ad data intended for online publication is performed. In alternative embodiments, export of ad data may be manually initiated. Automated intervals (e.g., once an hour, in the morning, afternoon, etc.) may also be supported.

Assuming not all online classified advertisements are intended for an e-commerce marketplace, at decision block 530, a determination is made regarding whether the current online classified advertisement is to be e-commerce enabled. If so, processing continues with block 540; otherwise processing branches to block 550. Various potential e-commerce sales models are described further below.

At block 540, e-commerce application linkage information is added to the advertisement's online classified format. According to one embodiment, HTML tags are added to the online ad batch file to link the online ads with an e-commerce application. Depending upon the implementation, the tags may cause a button to be rendered or hyperlink to be presented when a web page containing the ad is displayed to a prospective buyer. According to one embodiment, when selected, the buttons or hyperlinks included within or associated with the e-commerce enabled online classified advertisements cause a transaction relating to the subject of the online classified ad to be initiated.

At block 550, the batch file is transferred to the online classifieds database. The transfer may be via Extensible Markup Language (XML), File Transfer Protocol (FTP), Simple Object Access Protocol (SOAP), electronic files, such as HTML and/or email, web services, or any other method of electronic data transfer. In alternative embodiments, data transfer may be in real-time (e.g., on an ad-by-ad basis) or near real-time rather than batch mode.

In alternative embodiments, ad data may be sourced from other than a periodical publisher. For example, the ad data may originate at the online classifieds system or the e-commerce system. Also, the tagging and exporting processes may operate synchronously or asynchronously with respect to each other.

Further, while the current example is described in the context of populating an online classifieds database with ad data regarding e-commerce enabled online classifieds, ad data can be updated through a similar process.

Figure 6:
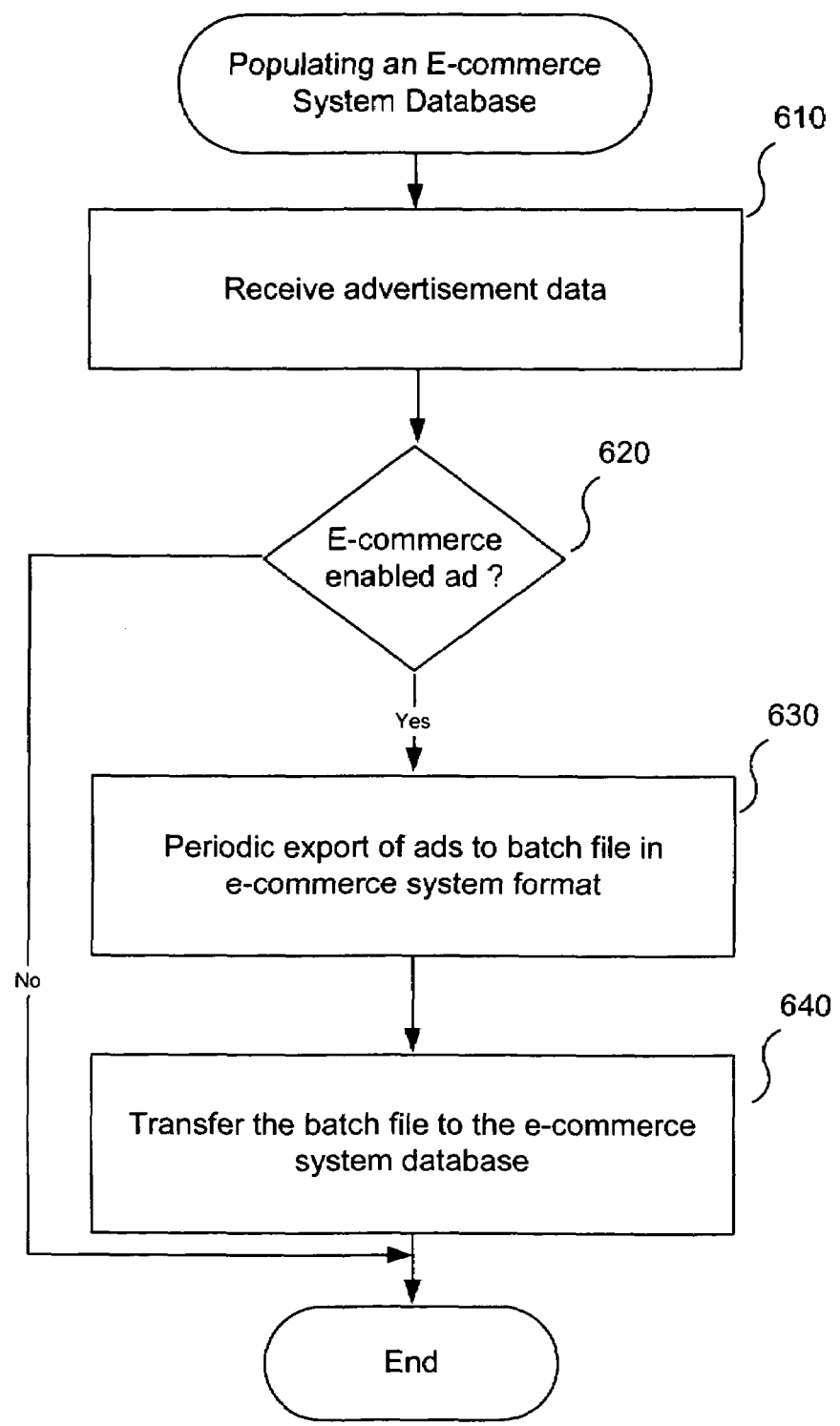
FIG. 6 is a flow diagram illustrating processing involved in connection with populating an e-commerce system database with information regarding e-commerce enabled online classified advertisements according to one embodiment of the present invention.

FIG. 6 is a flow diagram illustrating processing involved in connection with populating an e-commerce system database with information regarding e-commerce enabled online classified advertisements according to one embodiment of the present invention.

At block 610, data is received regarding an online advertisement. According to one embodiment, the data is initially received by a periodical publisher. For example, information associated with an item for sale may be provided to the periodical publisher in connection with placement of an online and/or print classified advertisement by the seller. Consequently, according to one embodiment, the advertisement data is received from an ad placement software database associated with the periodical publisher. The transfer of data from the ad placement software database may be active or passive and synchronous or asynchronous with respect to the ad taking process. For example, the ad data may be periodically pulled by the e-commerce ad enabler application 470 or pushed by the print classified ad database 410 to the e-commerce ad enabler application 470. Alternatively, transfer of ad data may be triggered after ads are placed.

Assuming not all online classified advertisements are intended for an e-commerce marketplace, at decision block 620, a determination is made regarding whether the current online classified advertisement is to be e-commerce enabled. If so, processing continues with block 630; otherwise processing is complete.

At block 630, periodic export of data relating to e-commerce enabled ads is performed. According to one embodiment, data relating to e-commerce enabled ads is exported from the ad placement software database into a batch file formatted in accordance with a target e-commerce system database format. According to one embodiment, an automated nightly export of ad data intended for e-commerce market place accessibility is performed. In alternative embodiments, export of ad data may be manually initiated.

At block 640, the batch file is transferred to the e-commerce system database. The transfer may be via Extensible Markup Language (XML), File Transfer Protocol (FTP), Simple Object Access Protocol (SOAP), electronic files, such as HTML and/or email, web services, or any other method of electronic data transfer. In alternative embodiments, data transfer may be in real-time (e.g., on an ad-by-ad basis) or near real-time rather than batch mode.

In alternative embodiments, ad data may be sourced from other than a periodical publisher. For example, the ad data may originate at the online classifieds system or the e-commerce system. Also, the formatting and exporting processes may operate synchronously or asynchronously with respect to each other.

Further, while the current example is described in the context of populating an e-commerce system database with ad data regarding e-commerce enabled online classifieds, ad data can be updated through a similar process.

Figure 7:
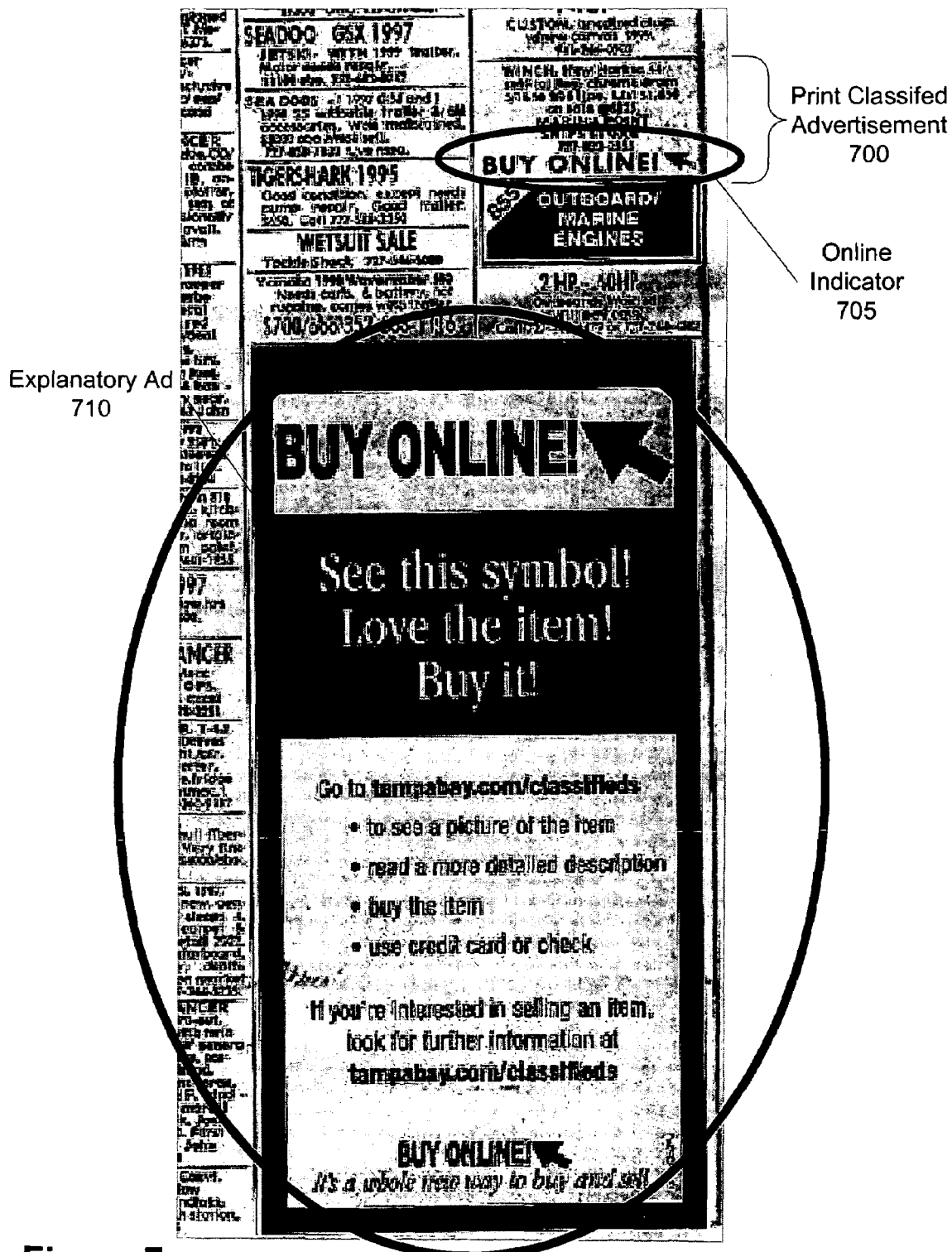
FIG. 7 illustrates a print classified advertisement that identifies the subject of the print classified advertisement as being available for online viewing and purchase according to one embodiment of the present invention.

FIG. 7 illustrates a print classified advertisement 700 that identifies the subject of the print classified advertisement as being available for viewing and purchase online according to one embodiment of the present invention. According to the present example, a unique method is used to link print classified advertisements to an e-commerce marketplace where more information can be obtained regarding the item for sale and/or a transaction relating to the item for sale can be completed.

According to one embodiment of the present invention, the print classified advertisement 700 includes an online indicator 705 for the purpose of luring readers of the printed periodical from the print environment onto an online environment, such as an e-commerce marketplace. In the present example, the periodical has placed within the print classified advertisement 700 an online indicator 705 in the form of text and a graphic. Various other indicia may be employed to specify which items may be found and purchased in the online environment. For example, the print classified advertisements having online counterparts that are e-commerce enabled may be printed in a different font or color than the other traditional classified advertisements. The periodical can also designate online accessibility of an item by placing the print ad for the particular item in a special location in print which will also designate that it is available for viewing and/or purchase in the online environment. For example, such print classified advertisements may be grouped together as a subcategory within the particular category in which they are listed. Alternatively, the print classified advertisements relating to items that are accessible in the online environment may be listed separately from the traditional classified advertisements.

According to one embodiment, the periodical may also provide readers with a method of finding a desired item in the online environment. For example, a unique identifier may be printed within or otherwise associated with the print classified advertisement that can be input into a search engine associated with the online environment. According to one embodiment, the text portion of the print classified advertisement 700 may include the unique identifier. Exemplary identifiers that might be used to search the online environment for the specific item include an ad number, the advertiser's phone number or certain portions of the text of the ad or the advertiser's account information. In a distributed architecture, in which ad placement, online ad display, and e-commerce are not collocated, typically, each system assigns a unique item identifier. In such a distributed architecture, a global unique ad id, such as the one generated upon ad placement by a periodical, for example, may be used to tie all the distributed records together. In alternative embodiments, the global unique item identifier can be originated from any of the participating systems and then communicated to the other systems.

Additionally, in the present example, the periodical classified section includes, in an adjoining print ad, an explanatory ad 710, such as a House Ad, to educate readers about the online indicia, the online environment, and/or the enhanced classified advertising service. Text in the explanatory ad 710 may describe where prospective buyers can go online to perform a search for the print classified ads having e-commerce enabled online counterparts. For example, this could be provided in the form of a Uniform Resource Locator (URL) such as http://www.adpay.com. Depending upon the implementation of the e-commerce marketplace, once on that web page, the prospective buyer may be able to search by the unique item identifier (if provided), by entering text relating to the item of interest, or by navigating among categories and/or subcategories.

FIG. 8 illustrates a user interface screen 800 through which a seller may e-commerce enable an online classified advertisement according to one embodiment of the present invention. The present example is illustrative of an exemplary web page that a periodical may use to upsell various e-commerce sales options while taking an order for a print classified advertisement and/or an online classified advertisement.

According to the present example, the seller may select a category and/or subcategory with which to associate the item for sale in area 805 via drop-down menus. This list of category and/or subcategory may match the print categories list. The seller is also provided with the ability to choose from among one or more options regarding the selling format. In the current example, the seller may place a standard online classified advertisement by selecting the radio button corresponding to option 1. Alternatively, the seller may select one of the e-commerce upgrade options 810. In the current example, the seller may choose to sell the item at a negotiated price (i.e., by selecting the negotiated price option 811), at a fixed price (i.e., by selecting the fixed price option 812), or using an auction format (i.e., by selecting the auction option). Various other e-commerce upgrade options are contemplated. In one embodiment, one or more e-commerce sales options may be the only choices made available to a seller. However, in other embodiments, print ads may be included or upsold along with the online classified ad. For example, one or more options (not shown) relating to the creation of one or more print ad corresponding to the online ad may be presented to the consumer at the end of the online ad entry process.

Figure 9:
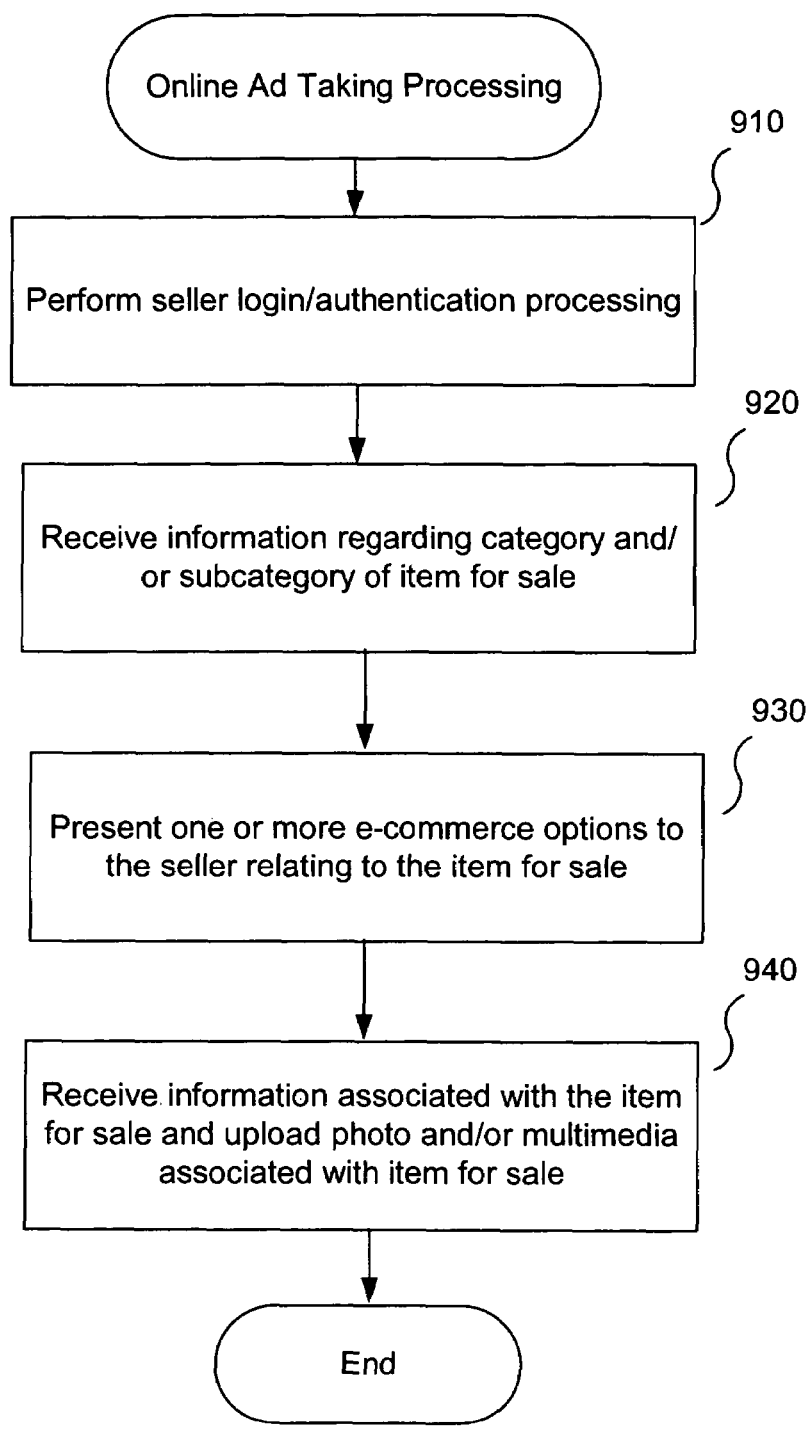
FIG. 9 is a flow diagram illustrating ad taking processing according to one embodiment of the present invention.

FIG. 9 is a flow diagram illustrating ad taking processing according to one embodiment of the present invention. According to the present example, a periodical publisher or an online classified system performs online ad taking processing via an online interface, such as a web portal, integrated with or otherwise communicatively coupled with an ad taker software program. At block 910, seller login and/or authentication processing are performed. According to one embodiment, the seller may use an email address as a login id. Alternatively a seller's account may be based upon the seller's identity and/or a newspaper account identifier. Or a username selected by the user or generated by the system.

At block 920, information regarding a category and/or subcategory of the item for sale is received.

At block 930, one or more e-commerce options are presented to the seller relating to various selling formats for the item for sale. As indicated above, exemplary e-commerce sales options include, selling the item at a negotiated price, selling the item at a fixed price, and selling the item using an auction format. According to one embodiment, the e-commerce options may be up-sold to prospective sellers in the form of an e-commerce only up-sell or as a combination of print and e-commerce up-sell.

At block 940, information associated with the item for sale is received. Basic information would typically include at least a short textual description of the item, one or more prices (e.g., the fixed price, a minimum price, and/or a reserve price) associated with the item depending upon the selected selling format, and contact information for the seller. Additionally, according to the present example, one or more digital photos and/or multimedia data may also be uploaded.

According to alternative embodiments, the prospective seller may place an order for a print classified advertisement and/or an online classified advertisement by interacting with a call center representative. In this case, the e-commerce up-sell may be communicated verbally by the call center representative. In other embodiments, the seller may submit an order for an online classified advertisement via email. Confirmation of the online classified advertisement may notify the consumer of various e-commerce upgrade options and include associated hyperlinks to enable the consumer to revise his/her order.

Figure 10:
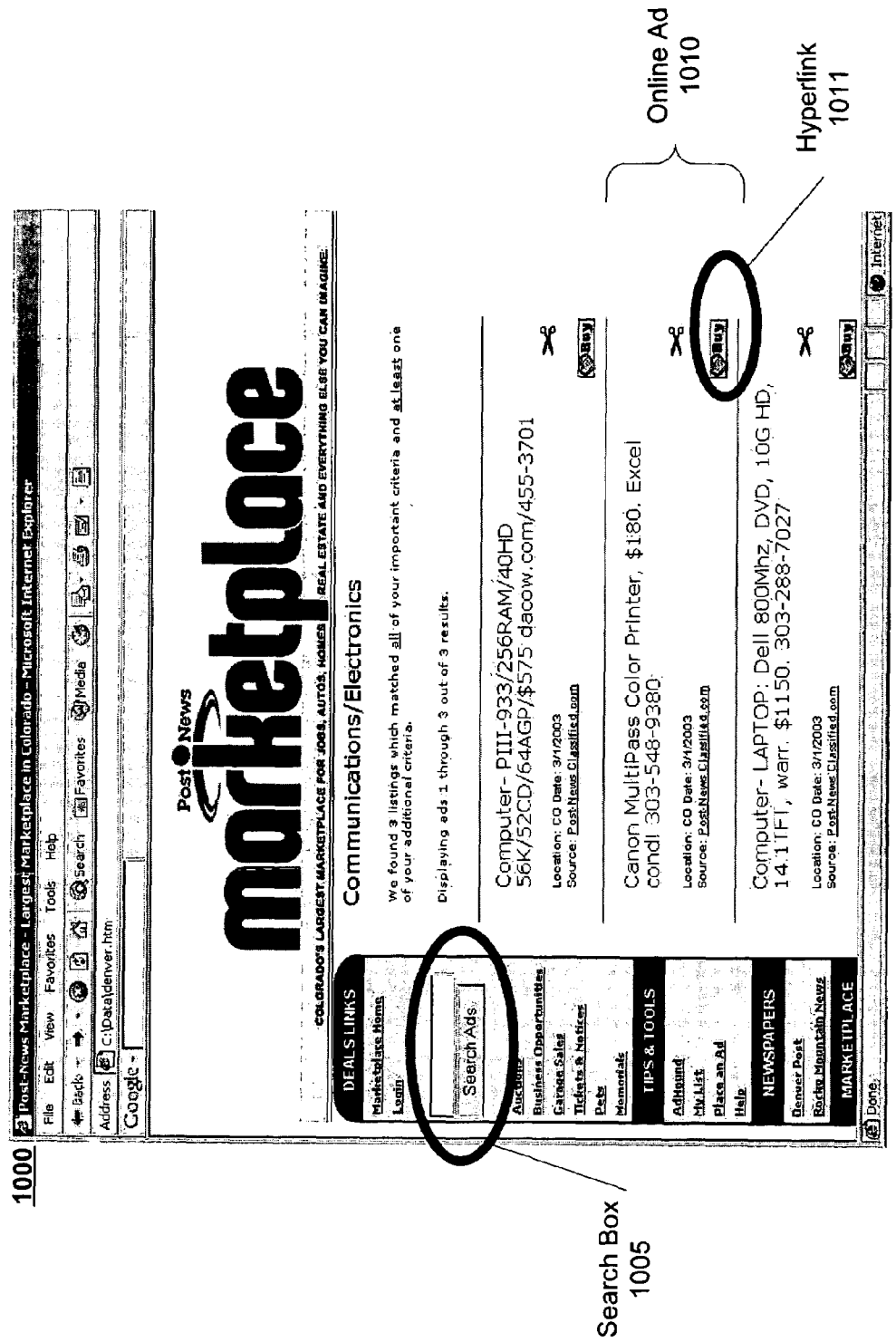
FIG. 10 illustrates a web site through which e-commerce enabled online classified advertisements may be located by consumers and e-commerce transactions regarding the subject of an e-commerce enabled online classified advertisement may be initiated according to one embodiment of the present invention.

FIG. 10 illustrates a web site 1000 through which e-commerce enabled online classified advertisements may be located by consumers and e-commerce transactions regarding the subject of an e-commerce enabled online classified advertisement may be initiated according to one embodiment of the present invention.

According to the present example, a unique method is used to bring buyers and sellers together in an online environment. This may be accomplished by associating a hyperlink, such as hyperlink 1011, in the form of a button, text, "hot spot", graphic or other method of linking with an online ad 1010 in the periodical's online classified site 1000.

According to one embodiment, this hyperlink will take the buyer to an e-commerce system where they may see more detail about the item, such as pictures, additional text, HTML formatted text, sound, video or any other electronic media. The e-commerce system also allows the potential buyer to make an offer to purchase the item at a specific price or make an offer or bid to purchase the item. In one embodiment, the e-commerce application is hosted by a third party, but when linked to from a particular periodical's online classified site may present a look and feel consistent with the originating site. As e-commerce enabled online classified advertisements become more pervasive, it is contemplated that the periodicals will begin internally hosting e-commerce applications to support the electronic marketplace functionality described herein.

In the present example, the web site 1000 also provides search engine functionality based upon text entry into a search box 1005. Prospective purchasers may enter the unique item identifier associated with the desired item, enter a category or subcategory name, or enter keywords descriptive of the type of product or service of interest.

Figure 11:
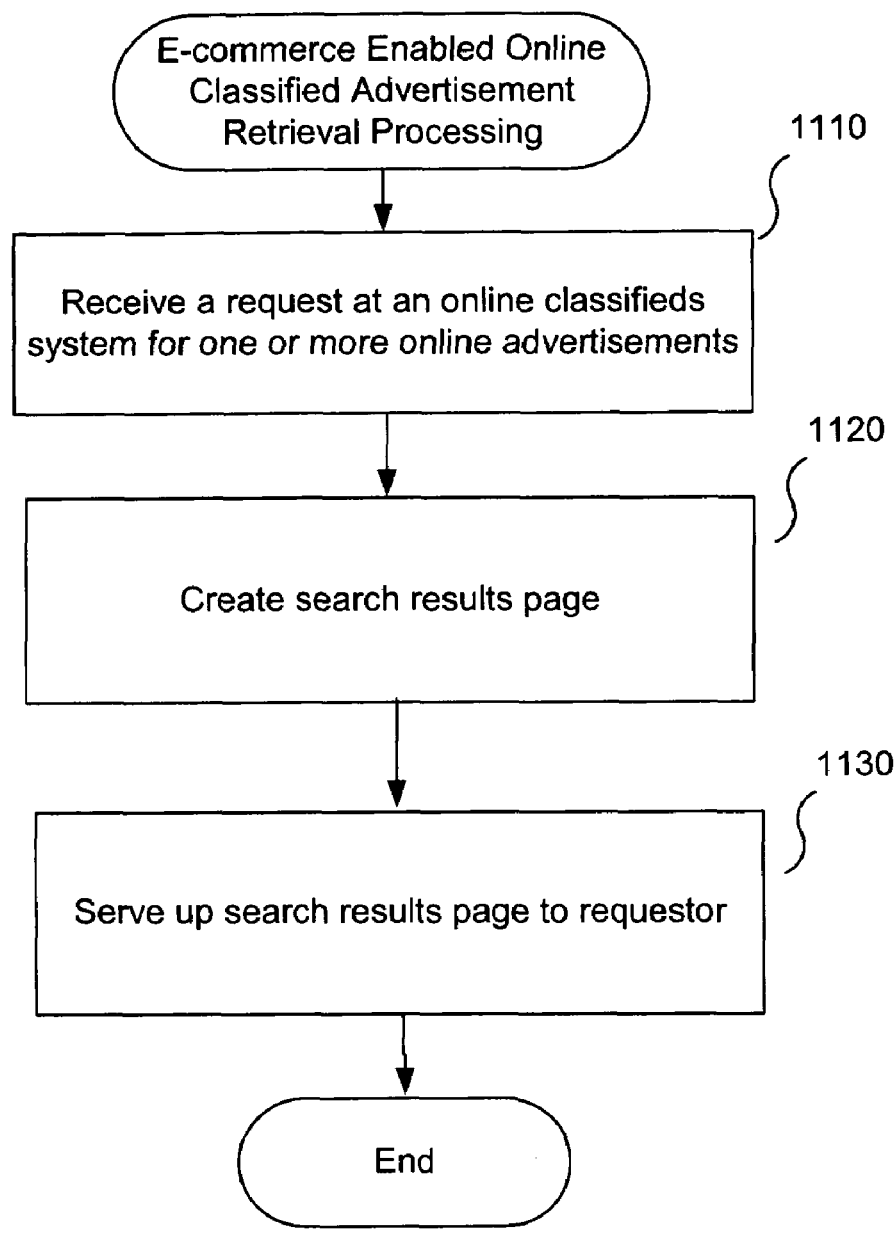
FIG. 11 is a flow diagram illustrating e-commerce enabled online classified advertisement retrieval and serving processing according to one embodiment of the present invention.

FIG. 11 is a flow diagram illustrating e-commerce enabled online classified advertisement retrieval and serving processing according to one embodiment of the present invention. According to the present example, at block 1110 a request is received at an online classifieds system for one or more online classified advertisements. The request may be in the form of a search request (e.g., by unique item identifier, by category and/or subcategory, or by text query) or as a result of a prospective purchaser browsing the online classified advertisement listings.

At block 1120, a search results page is created in accordance with the request. According to one embodiment, based upon text specified by a prospective purchaser to search for within the description of an online classified ad, a unique item identifier obtained from a print classified advertisement, and/or selection of a category or subcategory of classified items, the online classifieds system locates matching items in its online classifieds database and dynamically creates an HTML formatted search results page to be returned to the requester.

At block 1130, the search results page is served up to the requestor. In one embodiment, as illustrated in FIG. 10, the online ads returned in the search results page include a hyperlink 1011 that allows the prospective purchaser to initiate a transaction relating to an item of interest.

Figure 12:
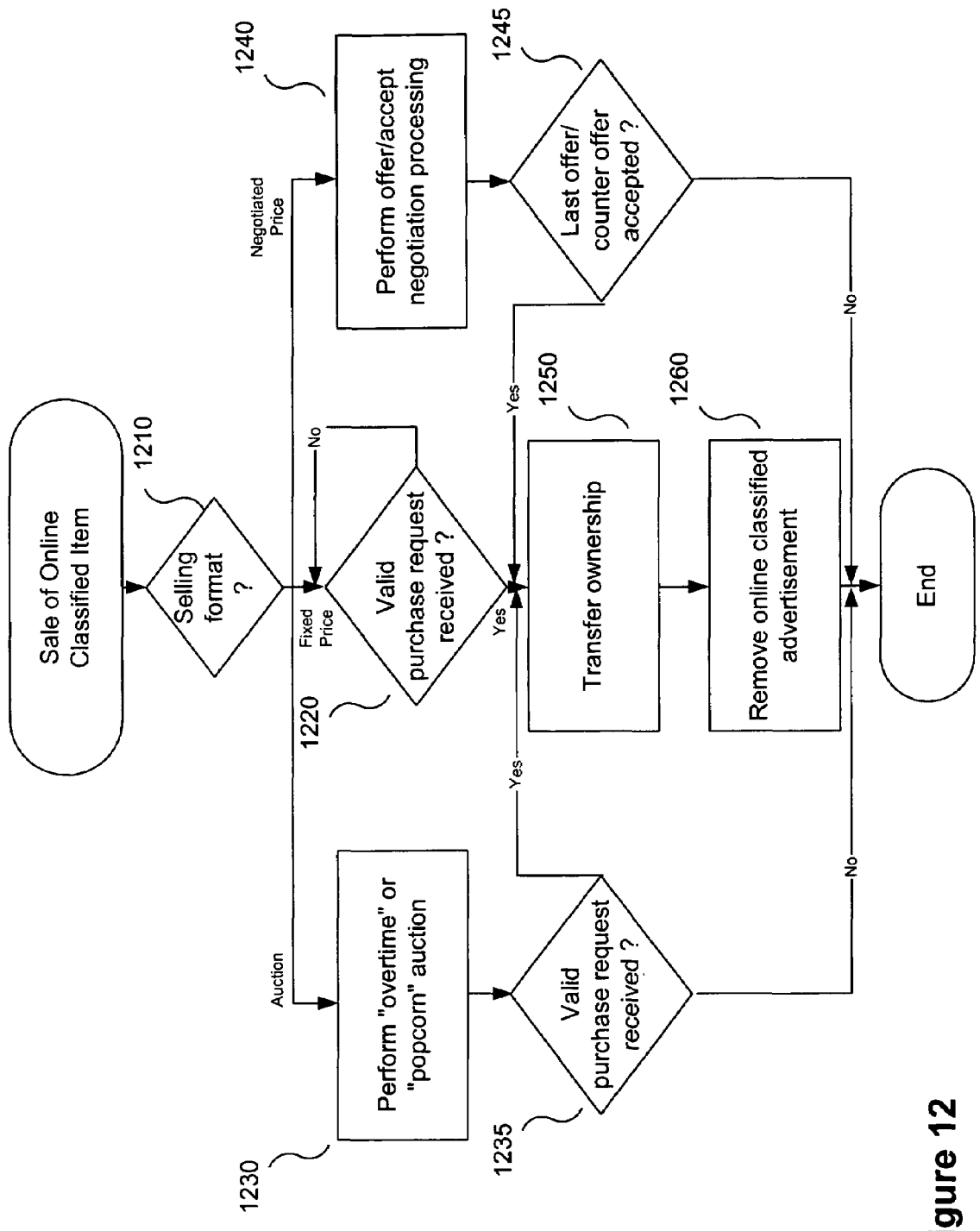
FIG. 12 is a flow diagram illustrating processing involved in the sale of an online classified item according to one embodiment of the present invention.

FIG. 12 is a flow diagram illustrating processing involved in the sale of an online classified item according to one embodiment of the present invention. According to the present example, the e-commerce application enables three different concurrent, but mutually exclusive per item selling formats, an auction format, a fixed price format, and a negotiated price format. That is, multiple selling formats may be simultaneously represented in the online environment. For example, some items in the online classifieds database may be purchased in accordance with a fixed price sales format while others may require submission of a bid in an auction sales format. Meanwhile, still other items may be purchased based upon a negotiated process.

At decision block 1210, a determination is made regarding the selling format of the classified ad item selected by the seller. This selling format determines how offers or bids will be processed. If the selling format for the item is an auction format, then the process of selling the online classified item continues with block 1230. If the selling format for the item is fixed price, then the sales processing continues with decision block 1220. If the selling format associated with the item is negotiated price, then the sale of the item continues with block 1240.

At block 1230, an online auction is performed to sell the item. In one embodiment, a form of auction called an "overtime" or "popcorn" auction is employed to address online auction "sniping" (i.e., at the last second, placing of a bid leaving competitors with no time to react to the bid). The auction format is called "overtime" or "popcorn" because the auction ends when either no bids are received during a certain time limit (e.g., 5 minutes) or when a predetermined time period elapses. For example, the close of an auction may be extended each time a bid is placed within the last few minutes of the scheduled close and this process may continue until five minutes have passed without any bid.

The auction process may schedule auctions for items in accordance with a first-in-first-out (FIFO) methodology or other scheduling criteria. When a particular item's auction is due to begin, relevant information regarding the item to be sold is retrieved from the online classifieds database and/or the e-commerce system database and an opening bid is determined based upon a predetermined formula involving the minimum bid, the minimum bid increment, the reserve price and/or other factors. For example, the opening bid may be calculated as a percentage of the reserve price.

The e-commerce system then monitors bids by prospective purchasers in the electronic marketplace that are participating in the auction for higher bids. When a higher bid is received, then the new bid is posted for other participants to see. After the auction ends, at decision block 1235, the e-commerce system compares the highest bid received with the item's reserve price to determine whether to transact the sale. If the highest bid is greater than the reserve price, then ownership of the item is transferred to the highest bidder at block 1250; otherwise, no sale takes place and the sale process terminates. According to alternative embodiments, other online auction formats, such as a standard reserve price auction, a Dutch auction, a declining price auction and the like may be employed.

At block 1220, the item is sold in accordance with a fixed price sales format by awaiting a valid purchase request at the fixed price. A valid purchase request may be a confirmed offer backed by a major credit card, one of a plurality of online payment solutions, such as PayPal, and/or a user account with the e-commerce system. If a valid purchase request is received during the pendancy of the online classified ad, then processing continues with block 1250.

At block 1240, the item is sold in accordance with a negotiated price sales format by performing offer/accept negotiation processing. According to one embodiment, the e-commerce application enables an online offer and accept system, using web pages, email, telephone and PBX systems, text messaging or any other method of electronic communication. In one embodiment, the goal is to mirror real world classified ad item sales in which the buyer makes an offer and the seller may make a counter offer, accept the offer or reject the offer. This electronic offer/counter offer/accept/reject process continues until a price acceptance is reached or finally rejected.

According to one embodiment, email messages convey offers, counter offers, acceptances and/or rejections. For example, when the prospective buyer makes an offer, an email message identifying the item and the proposed price is sent to the seller. Links may be provided within the email message to allow the seller to quickly accepts, reject or make a counter offer. If the seller accepts the buyers offer, an email message may be sent to the buyer with links to payment information. If the seller rejects the buyers offer, an email message may be sent to the buyer with one or more rejection reason codes or rejection reason text. Importantly, it should be noted that in accordance with this sales format, the seller does not have to accept the highest offer. In fact, the seller does not have to accept any offer. For example, the seller may be permitted to close or cancel the ad at anytime for any reason, with or without outstanding offers.

At decision block 1245, a determination is made whether either the buyer's or seller's last offer was accepted. If so, then transfer of ownership of the item takes place at block 1250.

For sake of brevity, an exemplary negotiated price sales format communications between a buyer and a seller are described in the context of email messages. It is contemplated, however, that other methods of electronic communication, such as web pages, instant messaging, text messaging, telephone and PBX systems, text messaging, wireless text messaging, wireless application protocol (WAP), short message service (SMS), and/or real time chat. Additionally, different electronic communication mechanisms may be used for different phases of the negotiation. For example, the buyer may submit an offer via email, the seller may submit a counter offer by wireless text messaging, and the buyer may accept the counter offer via telephone.

At block 1250, ownership transfer processing is initiated. According to one embodiment, this involves charging the buyers credit card, invoicing the buyer using one of a plurality of online payment solutions, such as PayPal, and/or debiting the buyer's e-commerce system account in the amount of the purchase price. Alternatively, the seller, may be willing to accept a check or money order. Concurrently with the transfer of money or after such transfer has been completed, physical transfer of the item (if a product) or evidence of entitlement (if a service) may be performed.

At block 1260, the online classified advertisement for the item is removed from the e-commerce system. For example, the item may be marked in the e-commerce system database as sold to preclude the item from being included in subsequent search results pages. At this point, an optional service charge based on the sales price of the item may be debited from the seller's e-commerce account.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising:
  (A) as part of an advertisement order entry process associated with a periodical publisher,
    (1) receiving information associated with a classified advertisement, including, but not limited to, contact information for a seller of a subject of the classified advertisement, a text description of the subject, and a price of the subject of the classified advertisement and further including an option to enhance the online classified advertisement with pictures and multimedia; and
    (2) providing to the seller information regarding an e-commerce option relating to selling the subject of the classified advertisement in an online auction according to which an e-commerce application will attempt to sell the subject of the classified advertisement in an online environment; and
  (B) responsive to the advertisement order entry process,
    (1) storing the information associated with the classified advertisement within a first database associated with the ad placement software and enabling an e-commerce transaction relating to the subject of the classified advertisement to be completed online by transferring the information associated with the classified advertisement from the first database to a second database associated with an e-commerce application;

(2) causing a house ad to be printed in the periodical that encourages prospective sellers of products or services to order e-commerce enabled online classified advertisements;

(3) creating an online presence for the subject of the classified ad in the form of an online version of the classified advertisement by transferring the information associated with the classified advertisement from the first database to the second database or a third database associated with an online classified advertisement system;

(4) creating an e-commerce transaction capability with respect to the subject of the classified advertisement by creating a web page for the online version of the classified advertisement and by adding e-commerce linkage information to the online version of the classified ad to cause a hyperlink to the e-commerce application to be displayed as part of the online version of the classified advertisement;

(5) causing the classified advertisement to be printed in a classified section of a periodical;

(6) facilitating the completion of an e-commerce transaction with respect to the subject of the classified advertisement by enabling interaction between a prospective buyer of the subject of the classified advertisement and a seller of the subject of the classified advertisement via the online environment in the form of supporting one or more types of electronic communication being exchanged between the prospective buyer and the seller; and (7) associating with the printed classified advertisement, an indication that the subject of the classified advertisement is available for purchase in the online environment.

2. The method of claim 1, wherein the house ad educates consumers about the indication.

3. The method of claim 1, wherein the periodical comprises a newspaper.

4. A computer-readable medium having stored thereon instructions which when executed by one or more processors cause a method to be performed comprising:

(A) as part of an advertisement order entry process associated with a periodical publisher,
  (1) receiving information associated with a classified advertisement, including, but not limited to, contact information for a seller of a subject of the classified advertisement, a text description of the subject, and a price of the subject of the classified advertisement and further including an option to enhance the online classified advertisement with pictures and multimedia, and
  (2) providing to the seller information regarding an e-commerce option relating to selling the subject of the classified advertisement in an online auction according to which an e-commerce application will attempt to sell the subject of the classified advertisement in an online environment; and (B) responsive to the advertisement order entry process,
  (1) storing the information associated with the classified advertisement within a first database associated with the ad placement software and enabling an e-commerce transaction relating to the subject of the classified advertisement to be completed online by transferring the information associated with the classified advertisement from the first database to a second database associated with an e-commerce application,
  (2) causing a house ad to be printed in the periodical that encourages prospective sellers of products or services to order e-commerce enabled online classified advertisements,
  (3) creating an online presence for the subject of the classified ad in the form of an online version of the classified advertisement by transferring the information associated with the classified advertisement from the first database to the second database or a third database associated with an online classified advertisement system,
  (4) creating an e-commerce transaction capability with respect to the subject of the classified advertisement by creating a web page for the online version of the classified advertisement and by adding e-commerce linkage information to the online version of the classified ad to cause a hyperlink to the e-commerce application to be displayed as part of the online version of the classified advertisement,
  (5) causing the classified advertisement to be printed in a classified section of a periodical;
  (6) facilitating the completion of an e-commerce transaction with respect to the subject of the classified advertisement by enabling interaction between a prospective buyer of the subject of the classified advertisement and a seller of the subject of the classified advertisement via the online environment in the form of supporting one or more types of electronic communication being exchanged between the prospective buyer and the seller, and
  (7) associating with the printed classified advertisement, an indication that the subject of the classified advertisement is available for purchase in the online environment.

5. The computer-readable medium of claim 4, wherein the house ad educates consumers about the indication.

6. The computer-readable medium of claim 4, wherein the periodical comprises a newspaper.

* * * * *